US011513267B2

(12) United States Patent
Lipson et al.

(10) Patent No.: US 11,513,267 B2
(45) Date of Patent: Nov. 29, 2022

(54) PATTERNED MIRROR EDGE FOR STRAY BEAM AND INTERFERENCE MITIGATION

(71) Applicant: Apple Inc., Cupertino, CA (US)

(72) Inventors: Ariel Lipson, Tel Aviv (IL); Itai Afek, Herzliya (IL); Jonathan Hauser, Ramat Gan (IL); Roei Remez, Tel Aviv (IL); Moshe Kriman, Tel Aviv (IL); Zafrir Mor, Ein Habsor (IL)

(73) Assignee: APPLE INC., Cupertino, CA (US)

( * ) Notice: Subject to any disclaimer, the term of this patent is extended or adjusted under 35 U.S.C. 154(b) by 876 days.

(21) Appl. No.: 16/404,771

(22) Filed: May 7, 2019

(65) Prior Publication Data
US 2019/0377068 A1 Dec. 12, 2019

Related U.S. Application Data

(60) Provisional application No. 62/802,223, filed on Feb. 7, 2019, provisional application No. 62/682,943, filed on Jun. 10, 2018.

(51) Int. Cl.
*G01C 3/08* (2006.01)
*G02B 5/18* (2006.01)
*G01S 7/481* (2006.01)
*G02B 27/42* (2006.01)
*G01S 17/89* (2020.01)

(52) U.S. Cl.
CPC .......... *G02B 5/1814* (2013.01); *G01S 7/4814* (2013.01); *G01S 7/4817* (2013.01); *G02B 27/42* (2013.01); *G01S 17/89* (2013.01)

(58) Field of Classification Search
CPC .. G02B 5/1814; G02B 27/42; G02B 27/0018; G02B 27/143; G02B 27/4233; G01S 7/4814; G01S 7/4817; G01S 17/89; G01S 7/4812; G01S 17/42

USPC ........................................................ 356/4.01
See application file for complete search history.

(56) References Cited

U.S. PATENT DOCUMENTS

| | | | |
|---|---|---|---|
| 7,095,504 B1 | 8/2006 | Ames et al. | |
| 7,986,412 B2 | 7/2011 | Jeong | |
| 9,012,008 B1 | 4/2015 | Hagopian et al. | |
| 9,255,887 B2 | 2/2016 | Brunner | |
| 9,645,287 B2 | 5/2017 | Brunner | |
| 2004/0157237 A1* | 8/2004 | Malak | G01N 33/54373 435/7.1 |
| 2007/0105339 A1* | 5/2007 | Faris | H01L 22/20 438/455 |
| 2015/0309225 A1 | 10/2015 | Moore | |

OTHER PUBLICATIONS

Shiri et al., "Poisson-spot intensity reduction with a partially transparent petal-shaped optical mask", Journal of Optics 15, pp. 1-7, 2013.

* cited by examiner

*Primary Examiner* — Md M Rahman
(74) *Attorney, Agent, or Firm* — Kligler & Associates Patent Attorneys Ltd (57) ABSTRACT

A method for optical sensing includes providing a mirror comprising a central reflective region surrounded by a peripheral glare-suppressing region. A beam of light from a laser light source is directed to reflect from the central region so as to pass through an output optic along an axis toward a target scene. The light returned from the target scene through the output optic is focused onto an optical sensor, via collection optics having a collection aperture surrounding the mirror.

12 Claims, 9 Drawing Sheets

PATTERNED MIRROR EDGE FOR STRAY BEAM AND INTERFERENCE MITIGATION

CROSS-REFERENCE TO RELATED APPLICATION

This application claims the benefit of U.S. Provisional Patent Application 62/682,943, filed on Jun. 10, 2018, and U.S. Provisional Patent Application 62/802,223, filed Feb. 7, 2019. Both of these related applications are incorporated herein by reference.

FIELD OF THE INVENTION

The present invention relates generally to optoelectronic sensing devices, and particularly to methods and components for mitigation of stray light in such devices.

BACKGROUND

Existing and emerging consumer applications have created an increasing need for real-time three-dimensional imagers. These imaging devices, also commonly known as light detection and ranging (LiDAR) devices, enable the remote measurement of distance (and often intensity) of each point on a target scene—so-called target scene depth—by illuminating the target scene with an optical beam and analyzing the reflected optical signal.

SUMMARY

Embodiments of the present invention that are described hereinbelow provide improved devices and methods for optical sensing.

There is therefore provided, in accordance with an embodiment of the invention, an optoelectronic device, including an output optic, having one or more optical surfaces, and a laser light source configured to emit a beam of light. A mirror includes a central region configured to reflect the beam from the laser light source through the output optic along an axis toward a target scene and a diffractive structure, which is disposed along an outer edge of the central region and is configured to diffract the light that is reflected back by the one or more optical surfaces of the output optic toward the mirror and is incident on the diffractive structure so that the incident light that is diffracted by the structure is deflected away from the axis. Collection optics are configured to receive the light returned from the target scene through the output optic via a collection aperture surrounding the mirror and to focus the collected light along the axis onto an optical sensor.

In some embodiments, the diffractive structure includes an array of radial protrusions protruding from the central region. In a disclosed embodiment, a shape of the radial protrusions is defined by a cosine curve.

Alternatively, the diffractive structure includes a periodic array of circles, disposed concentrically around the central region.

In some embodiments, the diffractive structure is configured to diffract the light that is reflected back by the one or more optical surfaces of the output optic into diffraction lobes that are directed away from the optical sensor in a focal plane of the collection optics. Alternatively or additionally, the diffractive structure is configured to diffract the light that is reflected back by the one or more optical surfaces of the output optic into multiple diffraction orders, which are spaced apart in a focal plane of the collection optics so that none of the diffraction orders is incident on the optical sensor.

In a disclosed embodiment, the output optic includes a beam steering device, which is configured to scan the beam reflected by the central region across the target scene. Additionally or alternatively, the output optic includes a window.

There is also provided, in accordance with an embodiment of the invention, an optoelectronic device, including an output optic, having one or more optical surfaces, and a light source configured to emit a beam of light. A mirror includes a central region configured to reflect the beam from the light source through the output optic along an axis toward a target scene and a peripheral region having a width of at least 1 mm surrounding the central region, and having an optical density that decreases smoothly in a radial direction over the width. Light collection optics are configured to receive the light returned from the target scene through the output optic via a collection aperture surrounding the mirror and to focus the collected light along the axis onto an optical sensor.

In a disclosed embodiment, the optical density of the peripheral region is equal to the optical density of the central region at an inner edge of the peripheral region and decreases to full transparency at an outer edge of the peripheral region. Typically, the width and optical density of the peripheral region are selected so that the light that is reflected back by the one or more optical surfaces of the output optic toward the mirror and is incident on the peripheral region is attenuated and not diffracted.

There is additionally provided, in accordance with an embodiment of the invention, a method for optical sensing, which includes providing a mirror including a central reflective region surrounded by a peripheral glare-suppressing region. A beam of light from a laser light source is directed to reflect from the central region so as to pass through an output optic along an axis toward a target scene. The light returned from the target scene through the output optic is focused onto an optical sensor, via collection optics having a collection aperture surrounding the mirror.

In one embodiment, the glare-suppressing region includes a diffractive structure, which is disposed along an outer edge of the central region and is configured to diffract the light that is reflected back by one or more optical surfaces of the output optic toward the mirror and is incident on the diffractive structure so that the incident light that is diffracted by the structure is deflected away from the axis.

Alternatively, the glare-suppressing region includes a peripheral region having a width of at least 1 mm surrounding the central region, and having an optical density that decreases smoothly in a radial direction over the width.

The present invention will be more fully understood from the following detailed description of the embodiments thereof, taken together with the drawings in which:

DETAILED DESCRIPTION OF EMBODIMENTS

Overview

LiDAR devices comprise a light source, typically a laser emitting a beam (or several beams) of light. (The terms "optical radiation" and "light" as used in the present description and in the claims refer generally to any and all of visible, infrared, and ultraviolet radiation.) In some LiDAR devices, the emitted beam is scanned across a target scene by a beam steering device, comprising, for example, one or more scanning mirrors. The light reflected from the scene is collected by light collection optics and focused onto an optical sensor.

In some devices of this sort, the light source and the light collection optics are brought into a coaxial configuration by the use of a small folding mirror, commonly at an angle of 45 degrees with respect to the emitted laser beam. The laser beam reflected by the mirror is received by the beam steering device and scanned across the target scene. In some configurations, the collection optics are positioned on the opposite side of the mirror from the beam steering device, in coaxial alignment with the beam reflected by the mirror. The aperture of the collection optics is sufficiently large so that the optics can collect the part of the light reflected by the target scene that bypasses the mirror.

Typically an enclosure protects the components of the LiDAR, with an output optic, such as a transparent window of the enclosure, transmitting the emitted and scanned beam toward the target scene, as well as receiving the beam reflected from the scene into the collection optics. A small fraction of the emitted and scanned beam, however, may be reflected by one or more of the optical surfaces of the output optic back into the LiDAR device as glare. This fraction is small, typically between a few tenths of a percent and a few percent (assuming the output surfaces to be coated with an anti-reflective coating). However, the intensity of the glare may still be comparable to that of the beam that is reflected back from a distant target scene. If the glare beam impinges on the edge of the folding mirror, it may diffract from the edge into the optical sensor and thereby interfere with detection of the return signal from the target scene.

The embodiments of the present invention that are described herein reduce or eliminate the amount of glare impinging on the optical sensor and thus enable the fabrication and operation of high-quality optical sensing devices with improved signal/noise ratio. Although these embodiments refer specifically to glare from the window of a LiDAR device, they may be similarly applied to mitigation of glare from other optical surfaces and may be applied in other devices that combine optical irradiation of a target and sensing of the radiation reflected from the target. These embodiments may also be applied to mitigation of stray beams originating in other optical devices.

In the disclosed embodiments, a peripheral region of the mirror, around the central reflecting region, is modified for reduction of glare on the optical sensor. In some embodiments, a diffractive structure disposed along the outer edge of the central region diffracts the glare that is reflected back toward the mirror and is incident on the diffractive structure, so that the incident light that is diffracted by the structure is deflected away from the axis of the device and thus away from the optical sensor. In one such embodiment, the diffractive structure comprises radial protrusions, which may have the form of teeth. In an alternative embodiment, the diffractive structure comprises an array of concentric rings, causing the glare beam to diffract into discrete orders. The rings are designed so that none of these orders impinge on the optical sensor.

In another embodiment, the optical density of the peripheral region decreases smoothly in the radial direction from the central reflecting area to the outer edge of the peripheral region. Typically (although not necessarily), the optical density drops to zero, or nearly zero, outside the peripheral region. The width of the peripheral region is sufficient so that the light that is reflected back by the optical surfaces of the output optic toward the mirror as a glare beam and is incident on the peripheral region is attenuated and not diffracted, thus preventing diffraction of the glare beam onto the optical sensor. Thus, in example embodiments, the width of the peripheral region is at least equal to the diameter of a typical glare beam, for example, at least 1 mm or at least 3 mm.

Glare Mitigation Using Diffractive Structures

Figure 1:
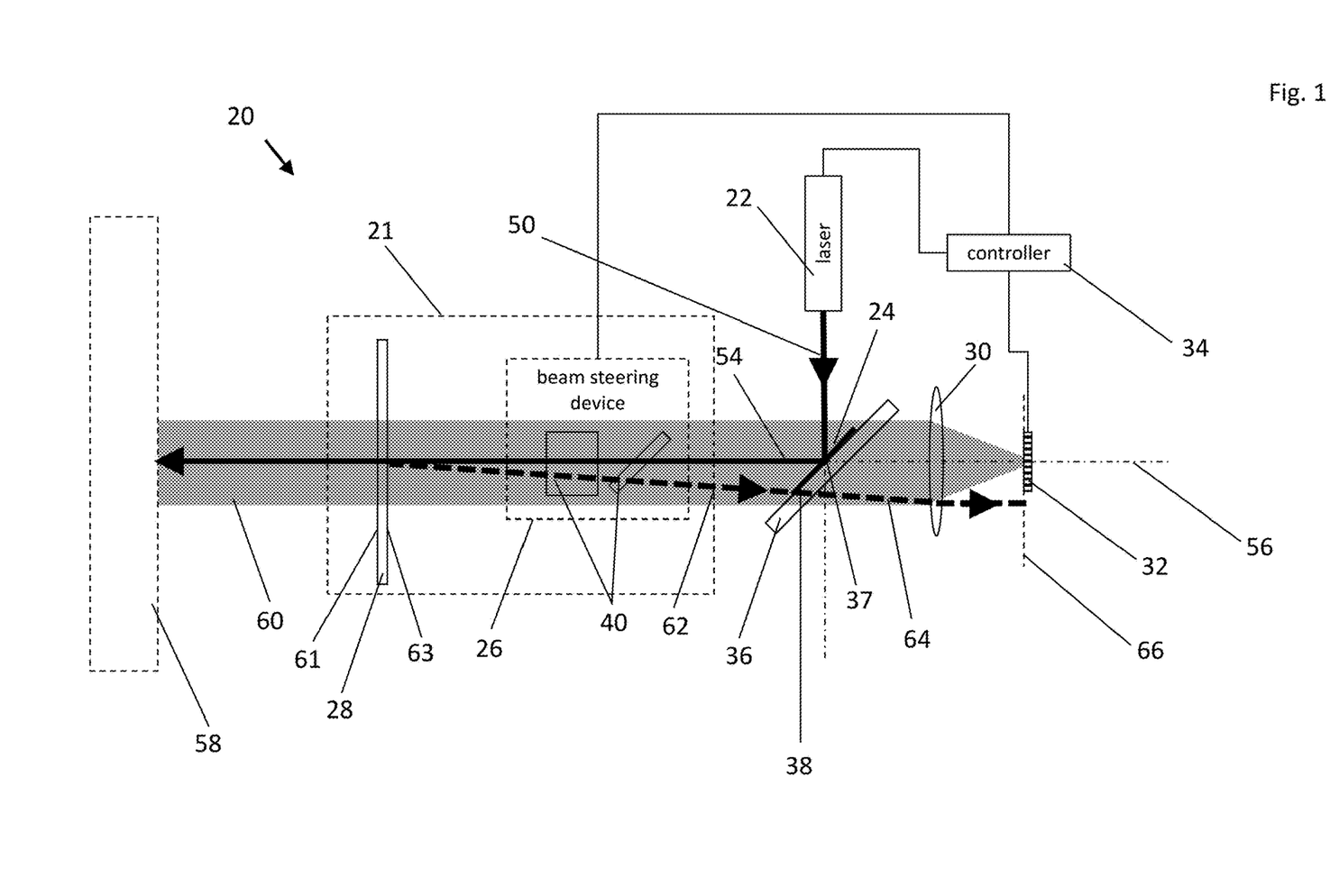
FIG. 1 is a schematic side view of a LiDAR device, in accordance with an embodiment of the invention.

FIG. 1 is a schematic illustration of a LiDAR device 20, in accordance with an embodiment of the invention. Certain specific features of device 20 are shown in the figures and described hereinbelow for the sake of concreteness and clarity in illustrating the principles of glare mitigation that are provided by embodiments of the present invention. Alternative implementations of these principles, in other sorts of optoelectronic devices and systems, will be apparent to those skilled in the art after reading the present description and are considered to be within the scope of the invention.

Device 20 comprises an output optic 21, a laser light source 22, a mirror 24, light collection optics 30, and an optical sensor 32. Output optic 21 comprises a beam steering device 26 and a window 28. Device 20 further comprises a controller 34, which is coupled to laser 22, to beam steering device 26, and to optical sensor 32. Mirror 24 in the present embodiment comprises a reflective coating deposited over a transparent substrate 36, but it may alternatively be a self-supporting mirror. The reflective coating may comprise a metal layer on the surface of substrate 36, or it may alternatively comprise a multi-layer structure, such as a polarization-selective reflector. Mirror 24 comprises a central reflective region 37 surrounded by a diffractive structure 38 along the outer edge of the central region, as will be described in further detail below.

Beam steering device 26 comprises two scanning mirrors 40, with mutually orthogonal axes of rotation, although other types and configurations of beam steering devices may alternatively be used. In order to simplify the figure, scanning mirrors 40 are shown in an unfolded ("in-line") configuration. Mirrors 40 and window 28 in this example have a total of four optical surfaces in output optic 21 (one for each mirror and two for the window).

Controller 34 typically comprises a programmable processor, which is programmed in software and/or firmware to carry out the functions that are described herein. Additionally or alternatively, at least some of the functions of controller 34 may be carried out by hardware logic circuits, which may be hard-wired or programmable. In either case, controller has suitable interfaces for receiving and transmitting data and instructions to and from other elements of device 20.

Laser 22 emits a beam 50, which central region 37 of mirror 24 receives and reflects into a beam 54. Beam 54 is scanned by beam steering device 26 through window 28 onto a target scene 58. Target scene 58 is shown schematically as being very close to device 20, although in reality it is located at a distance that is much larger than a typical dimension of the device. Beam 54 is scanned across scene 58, and returns from there as a reflected beam 60.

Figure 2A:
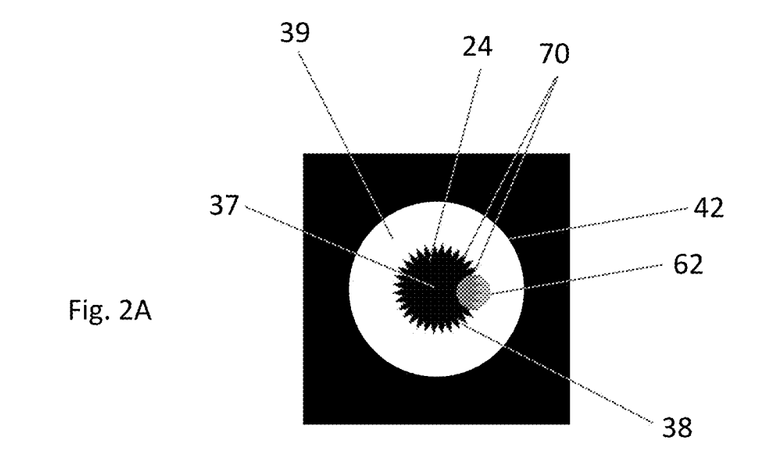
FIGS. 2A and 2B are schematic frontal views of a mirror and a sensor, respectively, with an incident glare beam, in accordance with an embodiment of the invention.
Figure 5A:
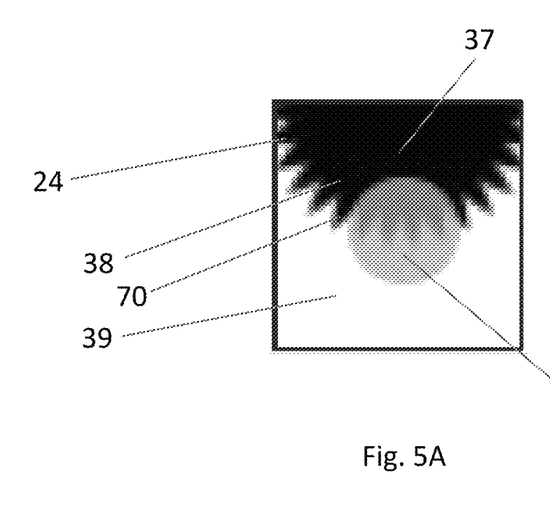
FIGS. 5A and 5B are images that schematically represent results of a diffraction simulation, in accordance with an embodiment of the invention.
Figure 7A:
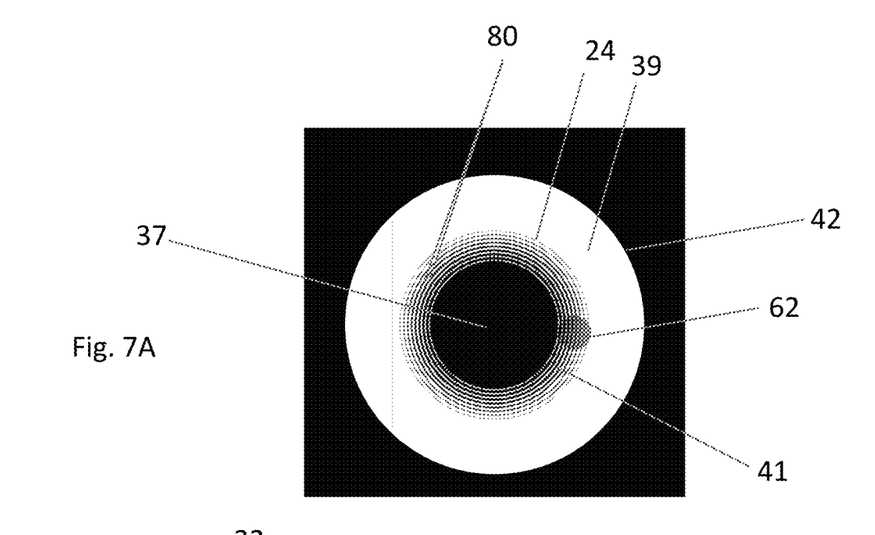
FIGS. 7A and 7B are schematic frontal views of a mirror and a sensor, respectively, with an incident glare beam, in accordance with another embodiment of the invention.

Beam 60 is collected and focused by light collection optics 30 along an optical axis 56 through a collection aperture onto optical sensor 32, which is located at a focal plane 66 of optics 30. The term "optical axis" is used in the present description and in the claims to denote the axis of symmetry of the optics. The collection aperture (as shown in FIGS. 2A, 5A, and 7A) in this case is an annular aperture, wherein mirror 24 defines its inner circumference and the apertures of output optic 21 and of light collection optics 30 define its outer circumference. Optical sensor 32, may comprise any suitable sort of detector or array of detectors, which convert the light from beam 60 into signals that are received by controller 34. For example, in a time-of-flight based LiDAR device, sensor 32 may comprise one or more avalanche photodiodes or single photon avalanche diodes (SPADs). Controller 34 converts these signals into a depth map of target scene 58, using techniques that are known in the art.

As beam 54 exits from device 20 through window 28, part of the beam is reflected from optical surfaces 61 and 63 of the window back into the device as a glare beam 62. Optical surfaces 61 and 63 are commonly coated by an anti-reflective coating in order to lower the reflectance of beam 54 to between a few tenths of a percent and a few percent. However, the optical flux received from target scene 58 as beam 60 may be low due both to a long distance to the target scene and to low reflectance of objects in the scene. Consequently, the flux of glare beam 62 may be significant in its magnitude as compared to that of beam 60.

Depending on the scan angle imposed on beam 54 by beam steering device 26, glare beam 62 may impinge on the edge of reflective central region 37 of mirror 24. In the absence of diffractive structure 38, a part of the diffracted flux of glare beam 62 could be diffracted at the edge of the mirror and impinge on optical sensor 32 after passing through light collection optics 30. To mitigate this potential problem, diffractive structure 38 is designed, as further detailed in the figures that follow, so as to shape any diffraction pattern around glare beam 62 to be directed away from optical sensor 32.

Figure 2B:
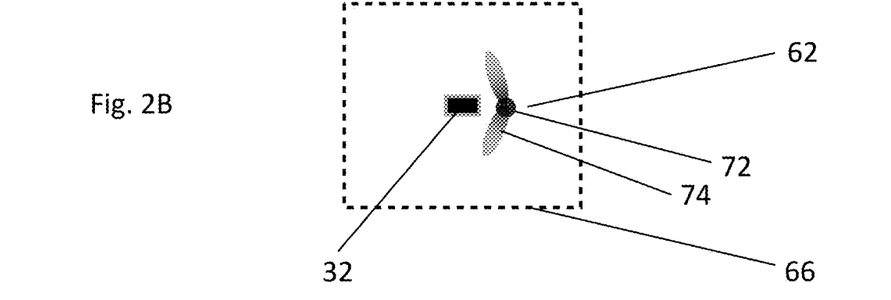

FIGS. 2A and 2B are schematic illustrations of glare beam 62 at mirror 24 and at focal plane 66 of device 20 (FIG. 1), respectively, in accordance with an embodiment of the invention.

Figure 3:
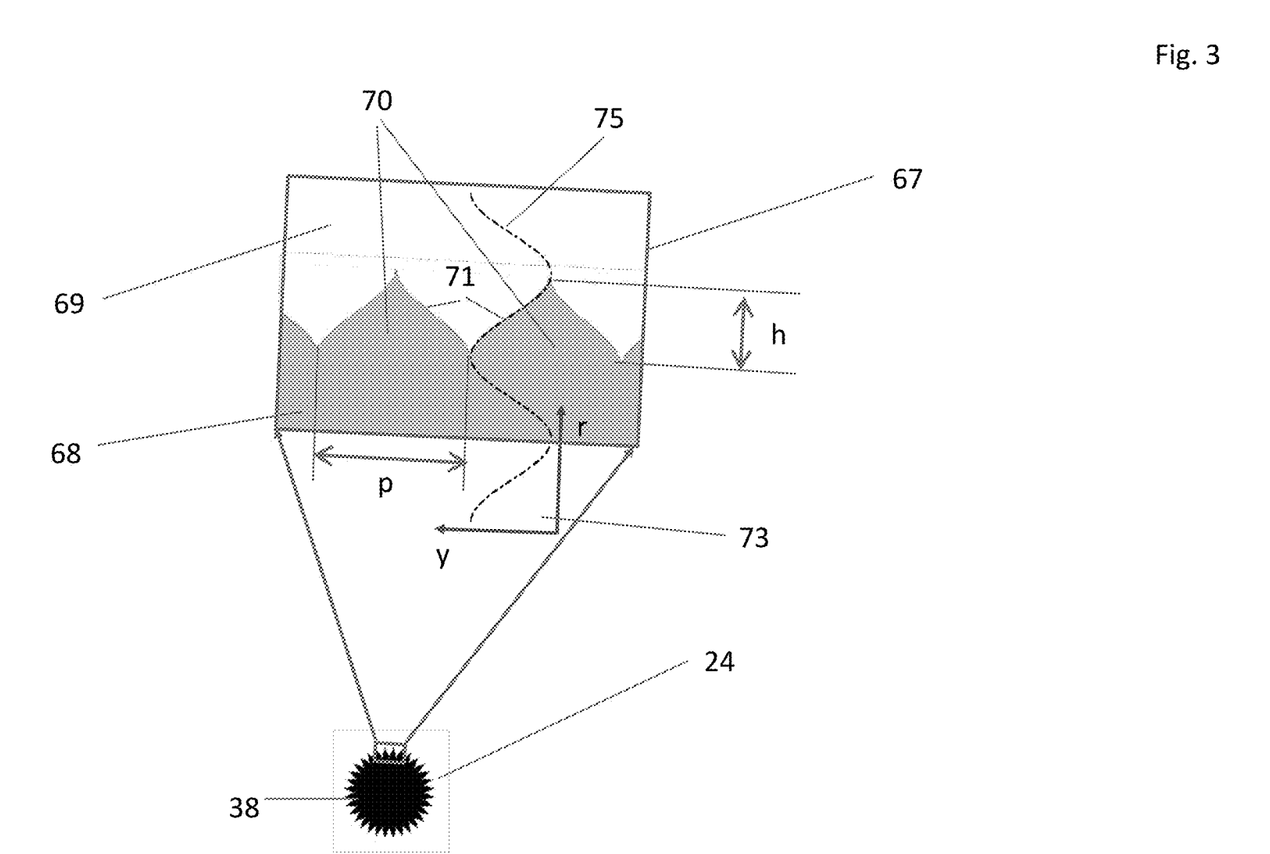
FIG. 3 is a schematic illustration of a diffractive structure on the mirror of FIG. 2A, in accordance with an embodiment of the invention.
Figure 4A:
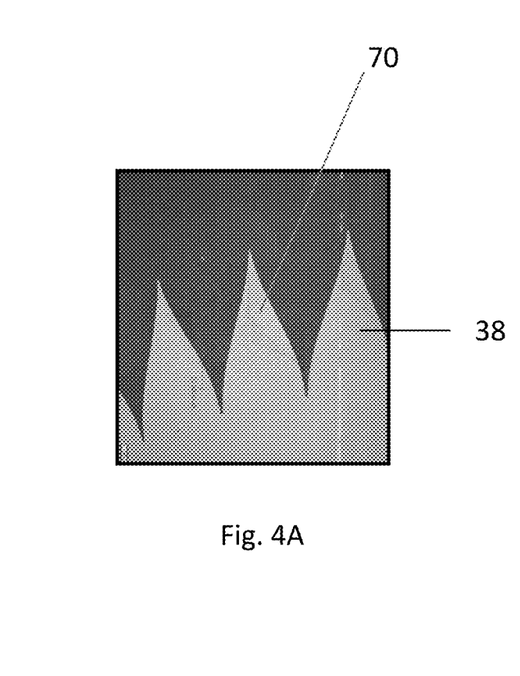
FIGS. 4A and 4B are schematic detail views of diffractive structures on the mirror of FIG. 2A, in accordance with further embodiments of the invention.
Figure 4B:
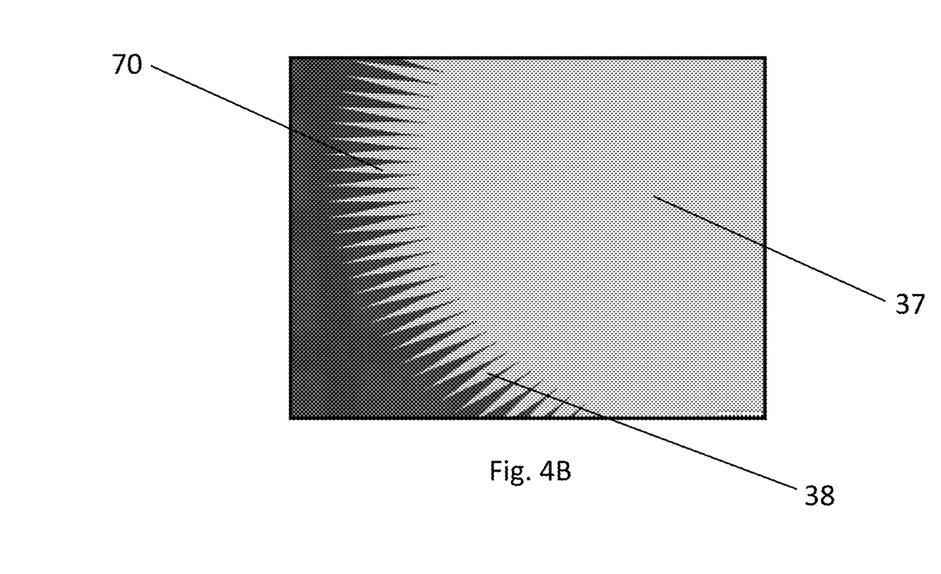

FIG. 2A shows mirror 24 with central region 37 and with diffractive structure 38 comprising an array of tooth-like radial protrusions 70, with further details and examples of such protrusions shown in FIGS. 3 and 4A-B. FIG. 2A also shows a collection aperture 39, through which light is focused onto sensor 32, bounded by mirror 24 and by an outer circumference 42. Glare beam 62 impinges on diffractive structure 38, and diffracts from protrusions 70. As shown in FIG. 2B, glare beam 62 on focal plane 66 has the form of a central, un-diffracted spot 72 and diffraction lobes having the form of "wings" 74. Due to the design of diffractive structure 38, wings 74 are deflected away from axis 56 (FIG. 1) and thus point away from optical sensor 32, rather than into the sensor.

FIG. 3 is a schematic detail view of diffractive structure 38 comprising radial protrusions 70 following the shape of a cosine-curve, in accordance with an embodiment of the invention. The same labels are used as in FIG. 1.

Details of diffractive structure 38 are shown in an inset 67. An area 68 is coated with the reflective coating of mirror 24, whereas an area 69 is transparent (without mirror coating). A border 71 separates between areas 68 and 69, defining petal-shaped protrusions 70. In the present embodiment, the shape of protrusions 70 is defined using a polar coordinate system 73, wherein the r-axis is a local radius of mirror 24, and the y-axis is perpendicular to the r-axis. In coordinate system 73, border 71 is defined by a function $y=(p/2)\cos[(\pi/h)r]$, wherein p is the period of protrusions 70, and h is their amplitude (radial length). The local r-axis is shifted around mirror 24, with opposing phases of the cosine function on the left and right sides of each protrusion 70 so that petal-like shapes are formed.

For a given protrusion amplitude h, an increase in the number of protrusions 70, i.e., decrease in period p, decreases the optical flux from diffraction wings 74 that reaches optical sensor 32. However, the number of protrusions 70 cannot be increased without limit due to limitations of the fabrication process. Moreover, the tip of each protrusion 70 is a source of unwanted diffraction, which also places a limit on the optimal number of the protrusions. Thus, the number of protrusions 70 is determined by an optimization that takes into account parameters such as, for example, the diameter of mirror 24, the capabilities of the fabrication process, and the amount of diffracted optical flux reaching optical sensor 32.

Using a cosine-function to define a petal-like shape for protrusions 70 has the advantage of providing a smooth transition of the transmittance of diffractive structure 38 from full blockage of glare beam 62 at the base of the protrusions to full transparency at the tips of the protrusions. The smooth transition of transmittance, including a smooth transition of its derivatives, provides for minimal unwanted diffraction by comparison, for example, with triangle-shaped protrusions.

FIGS. 4A and 4B are schematic detail views of diffractive structures 38 along the outer edge of central region 37 of mirror, in accordance with further embodiments of the invention. The same labels are used as in FIGS. 1, 2A-B, and 3. Structures 38 have petal-shaped protrusions following the cosine-shaped construction described above. Structures 38 in FIGS. 4A and 4B differ in terms of amplitude h and period p of protrusions 70.

Figure 5B:
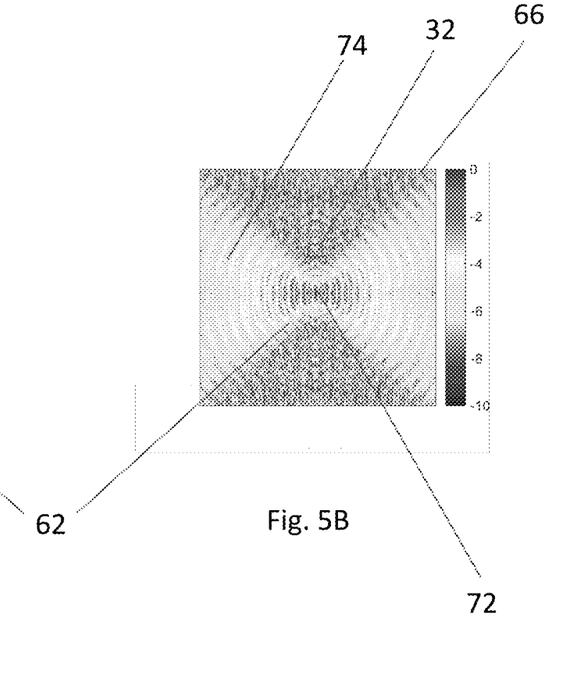

FIGS. 5A and 5B are images that schematically represent results of a diffraction simulation, in accordance with an embodiment of the invention. The same labels are used as in FIGS. 2A-B, but FIGS. 5A-B are rotated by 90 degrees relative to FIGS. 2A-B.

FIG. 5A shows glare beam 62, which is assumed to have a Gaussian profile, impinging on diffractive structure 38 with petal-like protrusions 70 of the type shown in FIG. 3.

The resulting diffraction pattern is shown in FIG. 5B. Diffractive structure 38 has diffracted glare beam 62 so strongly that nearly all the flux has been spread into wings 74, which are directed away from optical sensor 32.

Figure 6:
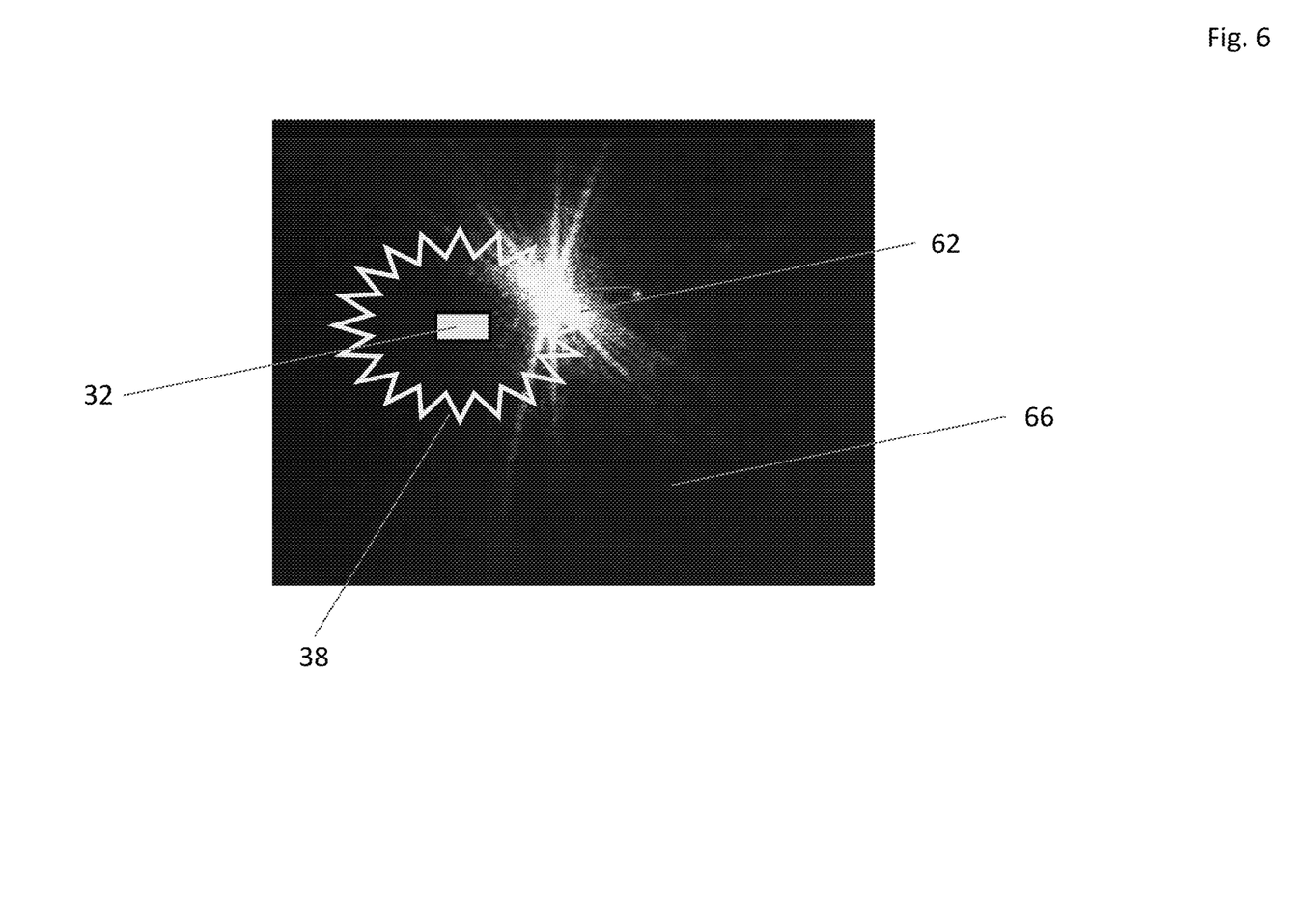
FIG. 6 is an image showing an experimentally recorded glare beam at the focal plane of the sensor of FIG. 2B, in accordance with an embodiment of the invention.

FIG. 6 is an image showing an experimentally recorded glare beam 62 at focal plane 66, in accordance with an embodiment of the invention. In addition to glare beam 62, FIG. 6 also shows schematically the location of optical sensor 32 and a projection of diffractive structure 38. The rays emanating out of beam 62 illustrate the actual directions of wings 74.

Figure 7B:
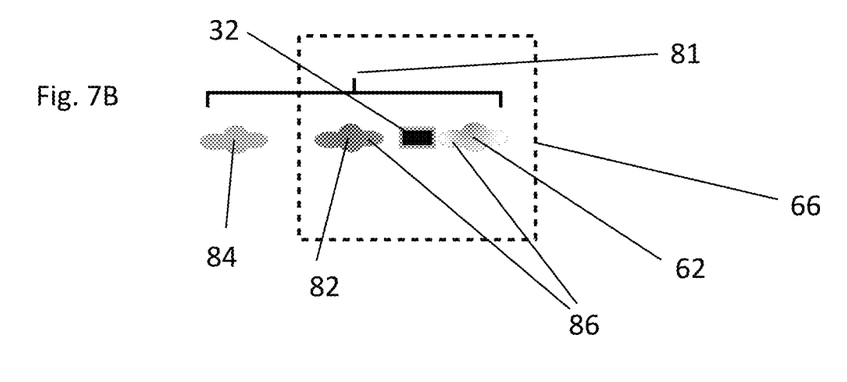

FIGS. 7A and 7B are schematic frontal views of mirror 24 and sensor 32, respectively, in accordance with another embodiment of the invention. This embodiment differs from that described above in that central region 37 of mirror is surrounded by a different sort of diffractive structure 41. FIGS. 7A and 7B also include illustrations of distributions of glare beam 62 at mirror 24 and at focal plane 66, respectively.

FIG. 7A shows mirror 24 with central region 37 and with diffractive structure 41 comprising a periodic array of alternating transparent and opaque circles 80, disposed concentrically around central region 37. Glare beam 62 impinges on diffractive structure 41, which diffracts beam into one or more orders along a radial direction. As shown in FIG. 7B, a resulting linear array 81 of spots impinge on focal plane 66. These spots comprise glare beam 62, which is the zeroth order of diffraction from diffractive structure 41, and spots 82 and 84, which are the first and second diffracted orders, respectively, from the diffractive structure. Glare beam 62 may diffract into a larger number of orders, as well as into orders on the opposite side of glare beam 62 (negative diffraction orders), but the resulting spots have been omitted for the sake of clarity, as they would be even further away from optical sensor 32 than the shown orders.

The direction of linear array 81 is perpendicular to the local direction of circles 80 at the glare beam, and its spatial frequency is determined by the local spatial frequency of circles 80 in the area of glare beam, as well as the distance from mirror 24 to focal plane 66. This spatial frequency is chosen by design so that beams 62 and spots 82, and 84 will not impinge on optical sensor 32. Each diffracted beam 62 or spot 82, 84, . . . , comprises wings 86 along the axis of linear array 81, but wings 86 are sufficiently short so as not to interfere with optical sensor 32.

Although the preceding figures show certain specific types of diffractive structures surrounding central region 37 of mirror 24, other sorts of diffractive structures may alternatively be used for the purpose of directing the diffracted part of glare beam 62 away from sensor 32 and are considered to be within the scope of the present invention.

Glare Mitigation Using Optical Attenuation

Figure 8:
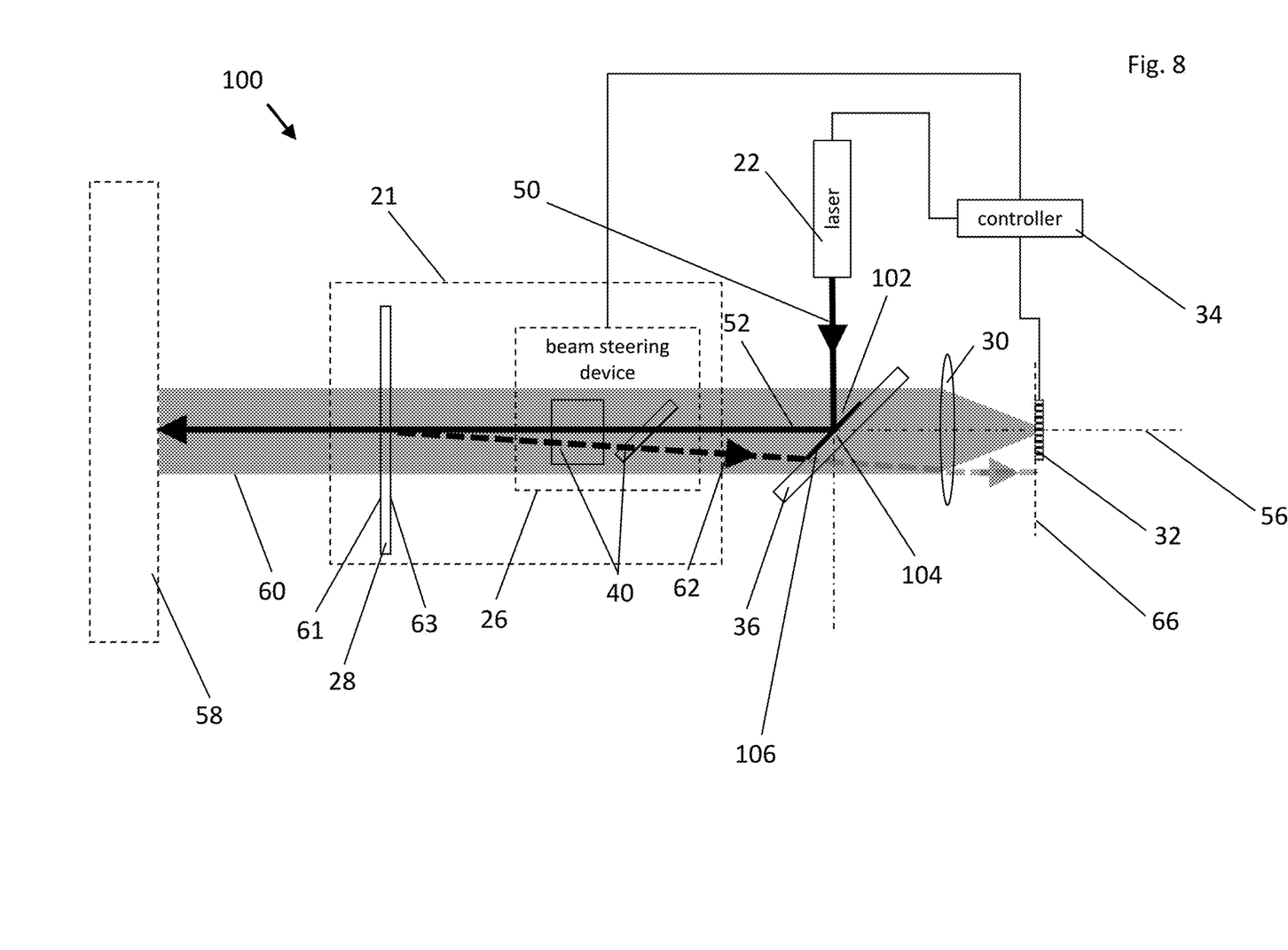
FIG. 8 is a schematic side view of a LiDAR device, in accordance with a further embodiment of the invention.

FIG. 8 is a schematic illustration of a LiDAR device 100, in accordance with another embodiment of the invention.

LiDAR device 100 is similar to LiDAR device 20 of FIG. 1, except that a mirror 102 replaces mirror 24. The same labels in FIG. 6 are used for items similar to those in FIG. 1. Mirror 102 comprises a central reflective region 104 and a peripheral region 106 whose optical density decreases radially away from central region 104 over the width of the peripheral region. The optical density of peripheral region 106 starts from the optical density of central region 104 at the inner edge of the peripheral region and decreases gradually, typically to full transparency at the outer edge of the peripheral region. The width of peripheral region 106 is chosen to be large enough to prevent any diffraction of glare beam 62 by mirror 102. For this purpose, for example, peripheral region 106 typically has a width at least equal to the diameter of glare beam 62. When reflected from a planar surface, such as one of surfaces 61 or 63 of window 28, the typical diameter of glare beam 62 is approximately 1 mm. When glare beam 62 is reflected from a concave or convex surface, its diameter may be larger or smaller than 1 mm, and, in the former case, a larger width of peripheral region 106 is required, for example 3 mm.

LiDAR device 100 functions in a similar way as device up to the point where glare beam 62 impinges on peripheral region 106. At this point, glare beam 62 is transmitted through peripheral region 106 with an attenuation due to the local optical density. However, due to the gradual change of the optical density, glare beam 62 does not diffract but rather impinges on focal plane 66 in the form of a compact spot, as shown in FIG. 7B, below.

Figure 9A:
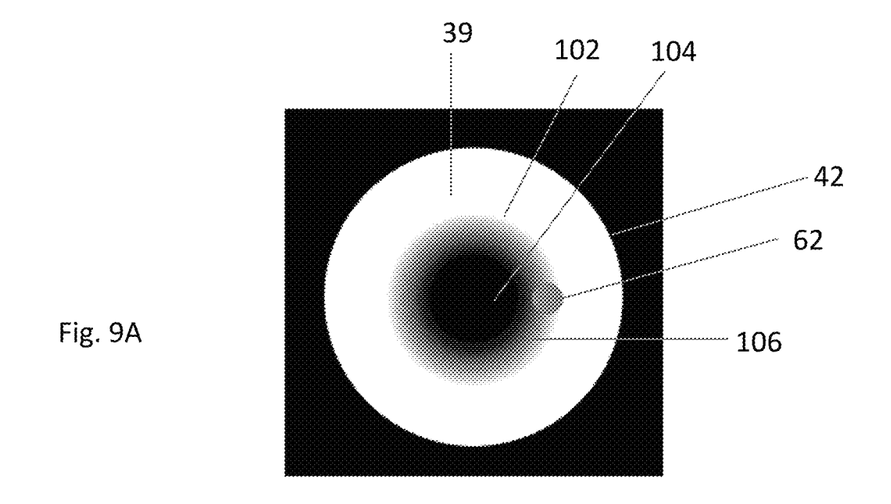
FIGS. 9A and 9B are schematic frontal views of a mirror and a sensor, respectively, with an incident glare beam, in accordance with a further embodiment of the invention.
Figure 9B:
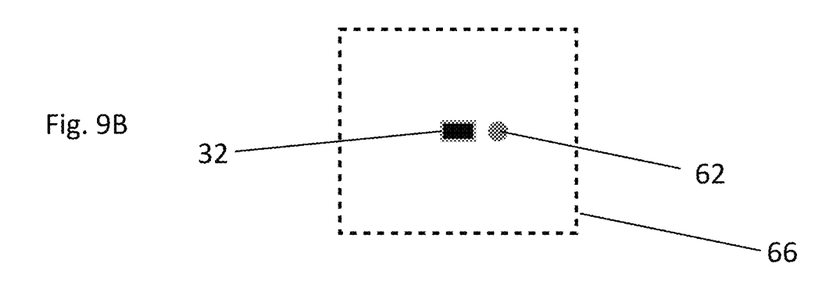

FIGS. 9A and 9B are schematic frontal views of mirror 102 and sensor 32, respectively, in device 100, in accordance with an embodiment of the invention. These figures show distributions of glare beam 62 at mirror 102 and at focal plane 66, respectively, in this embodiment.

Glare beam 62 impinges on peripheral region 106, and is transmitted with a reduced intensity due to the optical density of the peripheral region. However, at focal plane 66 glare beam 62 forms a compact spot due to the fact that the smoothly varying optical density of peripheral region 106 inhibits diffraction, and thus prevents deflection of any part of the glare beam toward optical sensor 32.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
   an output optic, having one or more optical surfaces;
   a laser light source configured to emit a beam of light;
   a mirror comprising:
      a central region configured to reflect the beam from the laser light source through the output optic along an axis toward a target scene; and
      a diffractive structure, which is disposed along an outer edge of the central region and is configured to diffract the light that is reflected back by the one or more optical surfaces of the output optic toward the mirror and is incident on the diffractive structure so that the incident light that is diffracted by the structure is deflected away from the axis;
   an optical sensor; and
   collection optics, which are configured to receive the light returned from the target scene through the output optic via a collection aperture surrounding the mirror and to focus the collected light along the axis onto the optical sensor.

2. The optoelectronic device according to claim 1, wherein the diffractive structure comprises an array of radial protrusions protruding from the central region.

3. The optoelectronic device according to claim 2, wherein a shape of the radial protrusions is defined by a cosine curve.

4. The optoelectronic device according to claim 1, wherein the diffractive structure comprises a periodic array of circles, disposed concentrically around the central region.

5. The optoelectronic device according to claim 1, wherein the diffractive structure is configured to diffract the light that is reflected back by the one or more optical surfaces of the output optic into diffraction lobes that are directed away from the optical sensor in a focal plane of the collection optics.

6. The optoelectronic device according to claim 1, wherein the diffractive structure is configured to diffract the light that is reflected back by the one or more optical surfaces of the output optic into multiple diffraction orders, which are spaced apart in a focal plane of the collection optics so that none of the diffraction orders is incident on the optical sensor.

7. The optoelectronic device according to claim 1, wherein the output optic comprises a beam steering device, which is configured to scan the beam reflected by the central region across the target scene.

8. The optoelectronic device according to claim 1, wherein the output optic comprises a window.

9. A method for optical sensing, comprising: providing a mirror comprising a central reflective region surrounded by a peripheral glare-suppressing region; directing a beam of light from a laser light source to reflect from the central reflective region so as to pass through an output optic along an axis toward a target scene; and focusing the light returned from the target scene through the output optic onto an optical sensor, via collection optics having a collection aperture surrounding the mirror;

wherein the glare-suppressing region comprises a diffractive structure, which is disposed along an outer edge of the central region and is configured to diffract the light that is reflected back by one or more optical surfaces of the output optic toward the mirror and is incident on the diffractive structure so that the incident light that is diffracted by the structure is deflected away from the axis.

10. The method according to claim 9, wherein the diffractive structure comprises an array of radial protrusions protruding from the central region.

11. The method according to claim 9, wherein the diffractive structure comprises a periodic array of circles, disposed concentrically around the central region.

12. The method according to claim 9, and comprising scanning the beam reflected by the central region across the target scene.

\* \* \* \* \*